United States Patent [19]

Tsushima et al.

[11] Patent Number: 4,758,845

[45] Date of Patent: Jul. 19, 1988

[54] THERMAL PRINTER CARRIAGE-MEDIUM TRANSPORT

[75] Inventors: Mitsuo Tsushima, Tamayama; Hiroshi Abe, Iwaki, both of Japan

[73] Assignee: Alps Electric Co., Ltd., Japan

[21] Appl. No.: 943,660

[22] Filed: Dec. 18, 1986

[30] Foreign Application Priority Data

Feb. 3, 1986 [JP] Japan .............................. 61-13218[U]

[51] Int. Cl.[4] .......................... G01D 15/10; B41J 3/20; B41J 19/68

[52] U.S. Cl. ................................ 346/76 PH; 346/136; 400/314; 400/320; 400/607.3; 400/608.2; 400/615; 400/615.2; 400/617; 400/646

[58] Field of Search ........................... 346/76 PH, 136; 400/120, 314, 320, 607.3, 608.2, 615, 615.2, 617, 646

[56] References Cited

U.S. PATENT DOCUMENTS 3,855,448 12/1974 Hanagata et al. .................... 219/216

4,565,461 1/1986 Usui et al. ........................... 400/611

4,591,882 5/1986 Takeuchi ............................ 346/136

*Primary Examiner*—E. A. Goldberg

*Assistant Examiner*—Gerald E. Preston

*Attorney, Agent, or Firm*—Guy W. Shoup; Leighton K. Chong

[57] ABSTRACT

A thermal printer having a main shaft supporting a carriage mounted with printing mechanisms including a printing head and an ink ribbon peeling member for peeling an ink ribbon off the recording sheet as the carriage travels, and fixedly provided with sheet feeding rollers for feeding a recording sheet. The carriage is moved along the main shaft for printing operation to print information on the recording sheet on a line. Before beginning a new line, the carriage is returned to the starting position while the main shaft is rotated to feed the recording sheet. Thus, the main shaft functions as both a guide shaft for guiding the carriage and a sheet feeding shaft for feeding the recording sheet, and thereby the construction of the thermal printer is simplified and the number of the components is reduced.

2 Claims, 1 Drawing Sheet

THERMAL PRINTER CARRIAGE-MEDIUM TRANSPORT

BACKGROUND OF THE INVENTION

1. Field of the Invention:

The present invention relates to a thermal printer comprising less components and capable of being manufactured at a reduced cost.

2. Description of the Prior Art:

The conventional thermal printer has an individual guide shaft for guiding the carriage, and an individual sheet feeding shaft for rotating a sheet feeding roller. Accordingly, the conventional thermal printer has a complicated construction and increased components, and hence the manufacturing cost is increased accordingly.

SUMMARY OF THE INVENTION

The present invention has been made to eliminate those disadvantages of the conventional thermal printer. Accordingly, it is an object of the present invention to provide a thermal printer comprising less components and capable of being manufactured at a reduced cost.

According to the present invention, a main shaft is used as both a guide shaft for guiding the carriage and a sheet feeding shaft, and thereby the construction of the thermal printer, as compared with the conventional thermal printer, is simplified, the number of the components is reduced and the manufacturing cost is reduced.

The above and other objects, features and advantages of the present invention will become more apparent from the following description of a preferred embodiment thereof taken in conjunction with the accompanying drawings.

DESCRIPTION OF THE PREFERRED EMBODIMENT

Figure 1:
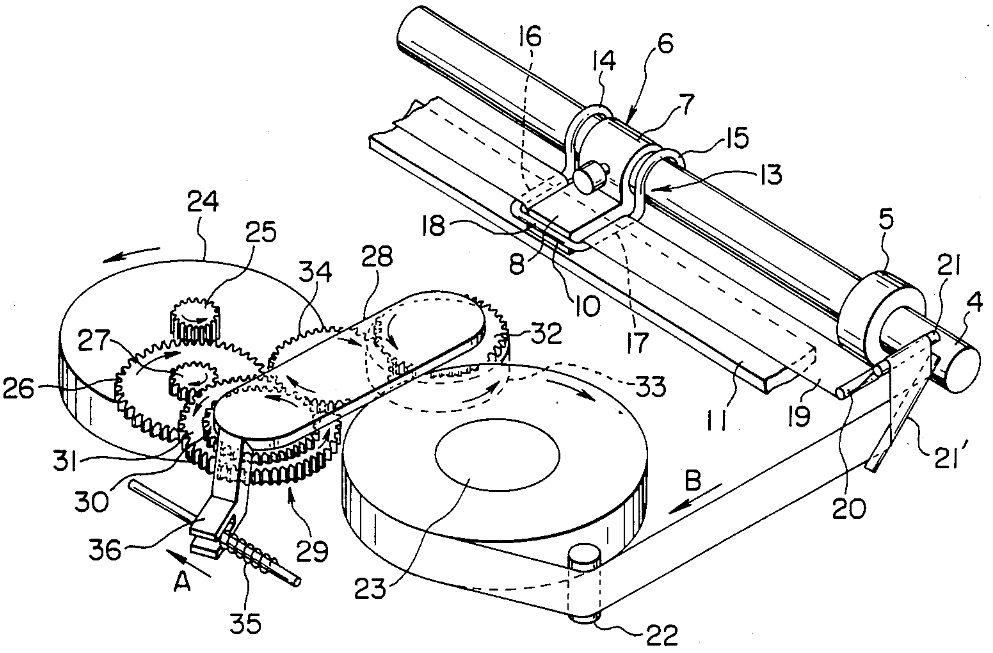
FIG. 1 is a fragmentary perspective view of the essential portion of a thermal printer, in a preferred embodiment, according to the present invention.
Figure 2:
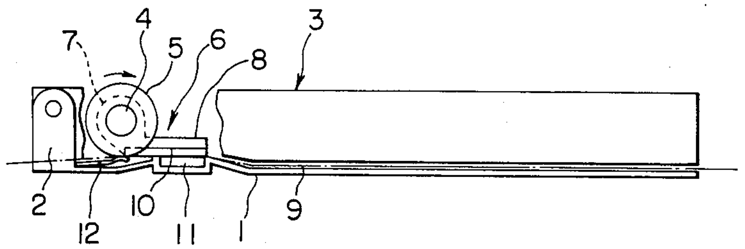
FIG. 2 is a side elevation of the essential portion of the thermal printer of FIG. 1.

Referring to FIG. 2, a supporting member 2 stands on a sheet guide plate 1 and pivotally supports a ribbon feeding mechanism and a main frame 3 accommodating a head shifting mechanism, not shown, and a carriage driving mechanism. A main shaft 4 is supported rotatably on the main frame 3. As illustrated in FIG. 1, a pair of sheet feeding rollers 5 are secured to the main shaft 4 near the opposite ends of the same respectively. A carriage 6 has a saddle portion 7 in sliding engagement with the main shaft 4, and a head supporting portion 8. The carriage 6 is capable of traveling between the sheet feeding rollers 5 along the longitudinal axis of the main shaft 4. A recording sheet 9 is passed through a small gap between the sheet guide plate 1 and the main frame 3 to a space between a head 10 attached to the lower surface of the head supporting portion 8 of the carriage 6, and a platen 11. The front end of the recording sheet 9 is pressed resiliently against the sheet feeding rollers 5 with sheet pressing springs 12.

When the main shaft 4 is rotated clockwise, as viewed in FIG. 2, the recording sheet 9 is moved leftward, as viewed in FIG. 2.

Referring to FIG. 1, an ink ribbon peeling member 13 is mounted on the carriage 6. The ink ribbon peeling member 13 has a pair of saddle portions 14 and 15 in sliding engagement with the main shaft 4 on the opposite sides of the saddle portion 7 of the carriage 6, respectively, and a pair of arms 16 and 17 formed so as to extend along the opposite sides of the head supporting portion 8 of the carriage, respectively, and a connecting arm 18 connecting the arms 16 and 17. As illustrated in FIG. 1, one side of the ink ribbon 19 extends along the platen 11 over the arms 16 and 17 of the ink ribbon peeling member 13 and through a space between the head 10 and a recording sheet, not shown, while the other side of the ink ribbon 19 is passed via guide rollers 20, 21, 21' and 22 and is wound on a spool 23. The guide rollers 20, 21, 21' and 22 and the spool 23 are accommodated in an ink ribbon cassette, not shown. In FIG. 1, there are also shown a motor 24, a pinion 25 formed as an integral part of the motor 24, an idle gear 26 rotatably supported on the frame of the thermal printer, a pinion 27 formed integrally with the idle gear 26, a swing lever 28, a first double gear 29 having a small gear 30 and a large gear 31, a second gear 32 combined with a ribbon feeding roller 33, and an idle gear 34 placed between the first double gear 29 and the second gear 32. The first double gear 29, the second gear 32 and the idle gear 34 are supported rotatably on the swing lever 28. The pinion 25 of the motor 24 and the idle gear 26, the gear 27 and the large gear 31 of the first double gear 29, the small gear 30 of the first double gear 29 and the idle gear 34, and the second gear 32 and the idle gear 34 are always engaged. A spring 35 pushes the arm 36 of the swing lever 28 in the direction of arrow A indicated in FIG. 1. When the ink ribbon cassette is mounted on the main frame 3, the ribbon feeding roller 33 mounted on the main frame 3 is pressed resiliently against the ink ribbon wound on the spool 23 contained in the ink ribbon cassette by the spring 35. The spring 35, the swing lever 28, the first double gear 29, the idle gear 34, the second gear 32 and the ribbon feeding roller 33 constitute a constant-pitch ink ribbon feeding mechanism. The constant-pitch ink ribbon feeding mechanism is accommodated in the main frame 3.

In operation, the output shaft of the motor 24 rotates counterclockwise. Then, the idle gear 26, the idle gear 34 and the spool 23 are rotated clockwise, while the first double gear 29, the second gear 32 and the ink ribbon feeding roller 33 are rotated counterclockwise. Consequently, the ink ribbon 19 is drawn in the direction of arrow B and is taken up on the spool 23. On the other hand, the carriage 6 travels rightward, as viewed in FIG. 1, peeling the ink ribbon 19 off the recording sheet 9 with the ink ribbon peeling member 13, while the head 10 performs printing operation to print desired information on the recording sheet 9. Upon the completion of the desired printing on one line, the main shaft 4 is rotated properly to feed the recording sheet.

Since the motor 24 rotates the ribbon feeding roller 33 combined with the second gear 32 at a fixed rate and the ribbon feeding roller 33 is in frictional engagement with the ink ribbon wound on the spool 23 for surface drive, the ink ribbon 19 is wound at a constant pitch on the spool 23 regardless of the diameter of the ink ribbon 19 wound on the spool 23.

Thus, according to the present invention, the main shaft 4 supports the carriage 6 slidably and is provided with the sheet feeding rollers 5 near the opposite ends thereof, so that the main shaft 4 functions as both a guide shaft for guiding the carriage 6 and a sheet feeding shaft for rotating the sheet feeding rollers 5. Accordingly, the thermal printer according to the present invenion is simpler than the conventional thermal printer in construction and is less than the conventional thermal printer in the number of the components, and hence the thermal printer of the present invention is capable of being manufactured at a reduced cost.

Although the invention has been described in its preferred form with a certain degree of particularity, it is to be understood that many variations and changes are possible in the invention without departing from the scope and spirit thereof.

What is claimed is:

1. A thermal printer comprising a carriage mounting a print head for printing on a recording sheet disposed facing said carriage, a main shaft on which said carriage is slidably supported for reciprocal movement in a widthwise direction of the recording sheet, and sheet feeding means including sheet feeding rollers provided on said main shaft for feeding the recording sheet in a lengthwise direction perpendicular to said widthwise direction, a frame provided with a lower wall along which the recording sheet is fed in substantially one plane along said lengthwise direction from an entry end to an exit end of said frame, wherein said main shaft is rotatably mounted toward the exit end of the frame extending in the widthwise direction above said lower wall, and the recording sheet is fed between the sheet feeding rollers on said main shaft and said lower wall of said frame.

2. A thermal printer according to claim 1, further comprising an ink ribbon cassette mounted in said frame parallel to said lower wall, and means for feeding an ink ribbon from said cassette, in front of said print head, and rewinding it back into said cassette, wherein said ink ribbon cassette includes means for feeding said ink ribbon by rewinding it in said ribbon cassette in constant spacing increments.

* * * * *